US012732789B2

(12) United States Patent
Natarajan et al.

(10) Patent No.: US 12,732,789 B2
(45) Date of Patent: Sep. 8, 2026

(54) METHOD, APPARATUS AND COMPUTER PROGRAM

(71) Applicant: Nokia Technologies Oy, Espoo (FI)

(72) Inventors: Rajesh Babu Natarajan, Bangalore (IN); Srinivas Bandi, Bangalore (IN); Betsy Covell, Chicago, IL (US); Alessio Casati, West Molesey (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 577 days.

(21) Appl. No.: 18/040,710

(22) PCT Filed: Jul. 12, 2021

(86) PCT No.: PCT/EP2021/069317

§ 371 (c)(1),
(2) Date: Feb. 6, 2023

(87) PCT Pub. No.: WO2022/028816

PCT Pub. Date: Feb. 10, 2022

(65) Prior Publication Data

US 2023/0328501 A1 Oct. 12, 2023

(30) Foreign Application Priority Data

Aug. 6, 2020 (IN) ............................ 202041033768

(51) Int. Cl.
*H04W 8/06* (2009.01)
*H04W 60/00* (2009.01)
*H04W 68/02* (2009.01)

(52) U.S. Cl.
CPC .......... *H04W 8/06* (2013.01); *H04W 60/005* (2013.01); *H04W 68/02* (2013.01)

(58) Field of Classification Search
CPC ..... H04W 8/06; H04W 60/005; H04W 68/02; H04W 8/12; H04W 68/12; H04W 88/14
See application file for complete search history.

(56) References Cited

U.S. PATENT DOCUMENTS

2011/0244880 A1 10/2011 Chin et al.
2019/0007992 A1 1/2019 Kim et al.
(Continued)

FOREIGN PATENT DOCUMENTS

EP 3503601 A1 6/2019
WO WO-2019001204 A1 * 1/2019 ........... H04W 48/18
(Continued)

OTHER PUBLICATIONS

Nokia et al., "KI#2: New solution: Resolving paging conflict using MUSIM Assistance Information.", S2-2004601, SA WG2 Meeting #139E, Jun. 1-12, 2020. (Year: 2020).*
(Continued)

*Primary Examiner* — Khoa Huynh
(74) *Attorney, Agent, or Firm* — Carter, DeLuca & Farrell LLP

(57) ABSTRACT

There is provided an apparatus, said apparatus comprising means for providing a first registration request from a user equipment to a first visited network for a first network slice provided by the first visited network and providing a further registration request from the user equipment to at least one second visited network for at least one second network slice provided by the second visited network, wherein the first network slice and at least one second network slice are mapped to subscribed network slices in a home network and the at least one second network slice is not provided by the first visited network.

10 Claims, 11 Drawing Sheets

S1 Providing a first registration request from a user equipment to a first visited network for a first network slice provided by the first visited network S2 Providing a further registration request from the user equipment to at least one second visited network for at least one second network slice provided by the second network, wherein the first network slice and at least one second network slice are mapped to subscribed network slices in a home network and the at least one second network slice is not provided by the first visited network

(56) References Cited

U.S. PATENT DOCUMENTS

| | | | | |
|---|---|---|---|---|
| 2019/0053147 | A1 | 2/2019 | Qiao et al. | |
| 2019/0200285 | A1 | 6/2019 | Velev et al. | |
| 2019/0261157 | A1 | 8/2019 | Ramle et al. | |
| 2019/0394711 | A1 | 12/2019 | Kim | |
| 2020/0137522 | A1 | 4/2020 | Gummadi et al. | |
| 2020/0163008 | A1 | 5/2020 | Hedman et al. | |
| 2020/0236528 | A1* | 7/2020 | Lee | H04W 8/082 |
| 2020/0329455 | A1 | 10/2020 | Ryu et al. | |
| 2023/0300729 | A1* | 9/2023 | Velev | H04L 41/0853 455/435.2 |

FOREIGN PATENT DOCUMENTS

| | | | |
|---|---|---|---|
| WO | 2019/120729 | A1 | 6/2019 |
| WO | 2020/095617 | A1 | 5/2020 |

OTHER PUBLICATIONS

Samsung et al., "TS 23.501: PLMN-specific NSSAI", S2-171891, SA WG2 Meeting #120, Mar. 27-31, 2017. (Year: 2017).*

"3rd Generation Partnership Project; Technical Specification Group Services and System Aspects; System architecture for the 5G System (5GS); Stage 2 (Release 16)", 3GPP TS 23.501, V16.4.0, Mar. 2020, pp. 1-430.

"3rd Generation Partnership Project; Technical Specification Group Services and System Aspects; Policy and charging control framework for the 5G System (5GS); Stage 2 (Release 16)", 3GPP TS 23.503, V16.4.1, Apr. 2020, pp. 1-115.

"3rd Generation Partnership Project; Technical Specification Group Core Network and Terminals; Non-Access-Stratum (NAS) functions related to Mobile Station (MS) in idle mode (Release 16)", 3GPP TS 23.122, V16.5.0, Mar. 2020, pp. 1-80.

"3rd Generation Partnership Project; Technical Specification Group Core Network and Terminals; 5G System; Access and Mobility Management Services; Stage 3 (Release 16)", 3GPP TS 29.518, V16.3.0, Mar. 2020, pp. 1-223.

"3rd Generation Partnership Project; Technical Specification Group Services and System Aspects; Architectural requirements (Release 16)", 3GPP TS 23.221, V16.2.0, Jun. 2019, pp. 1-53.

"KI: Area of service: impact on PLMN selection in roaming", SA WG2 Meeting #136-AH, S2-2000871, Agenda Item: 8.8, Nokia, Jan. 13-17, 2020, pp. 1-2.

"Connecting to multiple VPLMNs simultaneously", 3GPP TSG-SA WG2 #39, S2-041220, China Mobile, Apr. 19-23, 2004, pp. 1-6.

"MICO indication and all PLMN registration area allocation indication", 3GPP TSG-CT WG1 Meeting #108, C1-180627, Agenda item: 15.2.2.3, Huawei, Jan. 22-26, 2018, 12 pages.

"KI#3 New solution: Coordinated leaving Using MUSIM Assistance Information", SA WG2 Meeting #139E, S2-2003767, Agenda Item: 8.10, Nokia, Jun. 1-12, 2020, pp. 1-3.

"FS_MUSIM: KI #3, New Sol: Coordinated leaving for MUSIM device", SA WG2 Meeting #139E, S2-2004598, Agenda Item: 8.10, MediaTek Inc., Jun. 1-12, 2020, pp. 1-4.

"5GS Roaming Guidelines", GSM Association,NG.113, Version 2.0, May 28, 2020, pp. 1-36.

"Revised SID: Study on system enablers for multi-SIM devices", TSG SA Meeting #SP-83, SP-190179, Agenda Item: 17B.19, SA WG2, Mar. 20-22, 2019, 4 pages.

"3rd Generation Partnership Project; Technical Specification Group Core Network and Terminals; Non-Access-Stratum (NAS) protocol for 5G System (5GS); Stage 3; (Release 16)", 3GPP TS 24.501, V16.4.1, Mar. 2020, pp. 1-666.

"IEEE 802.11", Wikipedia, Retrieved on Mar. 8, 2023, Webpage available at : https://en.wikipedia.org/wiki/IEEE_802.11.

Aboba et al., "The Network Access Identifier", RFC 4282, Network Working Group, Dec. 2005, pp. 1-16.

Invitation to Pay Additional Fees received for corresponding Patent Cooperation Treaty Application No. PCT/EP2020/072104, dated May 6, 2021, 11 pages.

"Support for paging reception for UE with Multiple SIMs", 3GPP TSG-SA WG Meeting #86, S1-191073, Agenda Item: 8.9 FS_MUSIM, LG Electronics, May 6-10, 2019, 3 pages.

International Search Report and Written Opinion received for corresponding Patent Cooperation Treaty Application No. PCT/EP2020/072104, dated Jul. 6, 2021, 21 pages.

"Solution: MT Service notification for MUSIM UE", 3GPP TSG-SA2 Meeting #136-AH, S2-2000650, Agenda Item: 8.4 Study on system enablers for multi-USIM devices, LG Electronics, Jan. 13-17, 2020, pp. 1-4.

International Search Report and Written Opinion received for corresponding Patent Cooperation Treaty Application No. PCT/EP2021/069314, dated Oct. 28, 2021, 23 pages.

"3rd Generation Partnership Project; Technical Specification Group Services and System Aspects; Study on system enablers for devices having multiple Universal Subscriber Identity Modules (USIM) (Release 17)", 3GPP TR 23.761, V0.4.0, Jun. 2020, pp. 1-77.

"3rd Generation Partnership Project; Technical Specification Group Services and System Aspects; Procedures for the 5G System (5GS); Stage 2 (Release 16)", 3GPP TS 23.502, V16.5.0, Jul. 2020, pp. 1-594.

International Search Report and Written Opinion received for corresponding Patent Cooperation Treaty Application No. PCT/EP2021/069317, dated Nov. 11, 2021, 17 pages.

"3rd Generation Partnership Project; Technical Specification Group Services and System Aspects; Study on Support for Multi-USIM Devices (Release 17)", 3GPP TR 22.834, V17.2.0, Dec. 2019, pp. 1-17.

"KI#2: New solution: Resolving paging conflict using MUSIM Assistance Information", SA WG2 Meeting #139E, S2-2004601, Agenda Item: 8.10, Nokia, Jun. 1-12, 2020, pp. 1-6.

"FS_EASNS: Simultaneous access to multiple slices on different VPLMNs clarification", 3GPP TSG-SA WG1 Meeting #92e, S1-204088, Nokia, Nov. 11-20, 2020, 2 pages.

"KI#2, KI#3: new solution: notification via other USIM UDM", SA WG2 Meeting #140-e, S2-2005044, Agenda Item: 8.10, Nokia, Aug. 19-Sep. 2, 2020, pp. 1-5.

Office Action received for corresponding European Patent Application No. 21743462.0, dated Oct. 30, 2024, 3 pages.

* cited by examiner 100
106
5GC
AUSF
116
UDM
118
UDR
122
NEF
124
AF
108
N33
N13
N8
N12
N10
N29
AMF
112
SMF
114
N11
N4
UPF
120
N6
DN
110
N3
N2
N1
5G RAN
104
Terminal
102

Figure 6

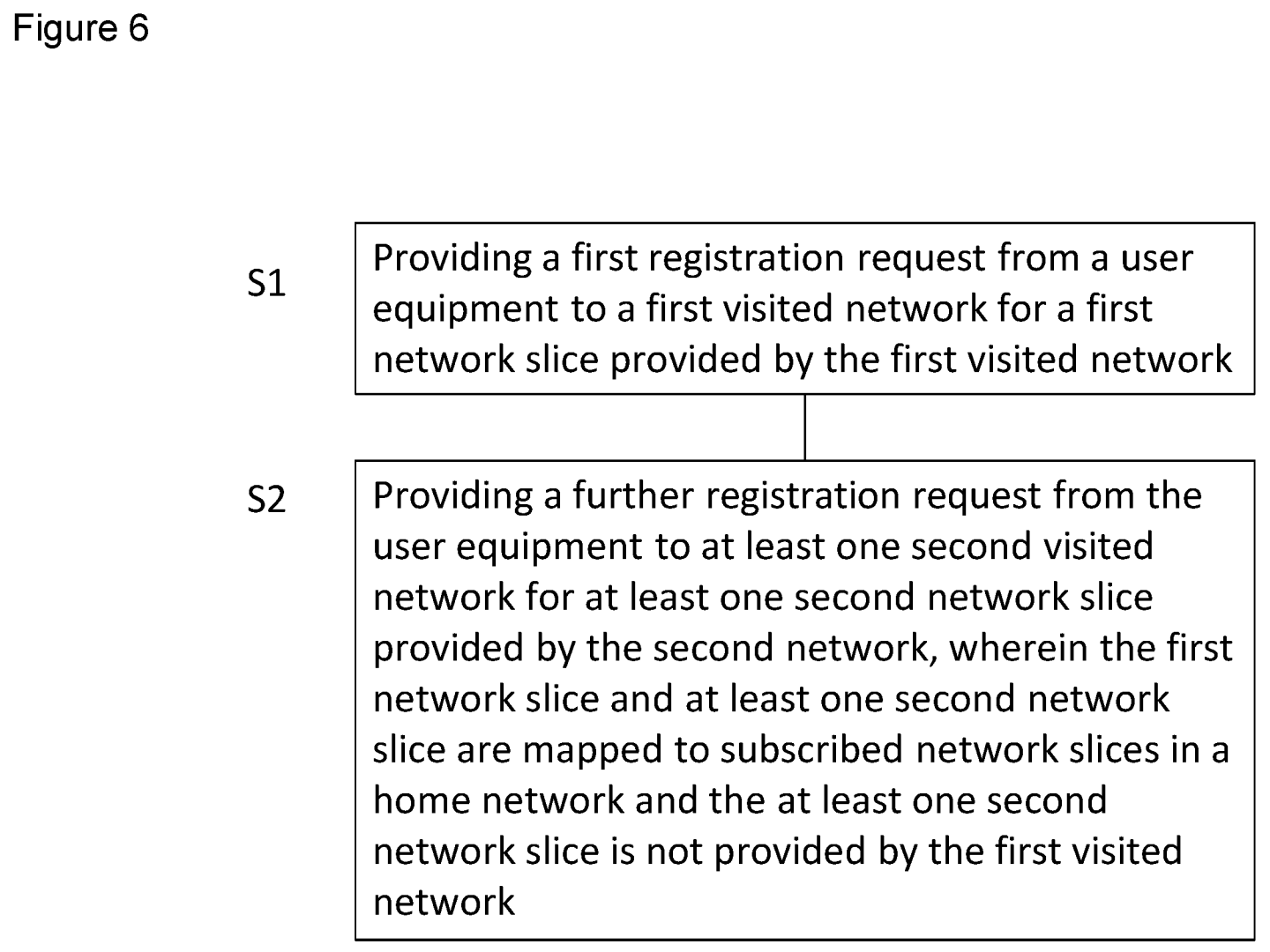

S1 Providing a first registration request from a user equipment to a first visited network for a first network slice provided by the first visited network S2 Providing a further registration request from the user equipment to at least one second visited network for at least one second network slice provided by the second network, wherein the first network slice and at least one second network slice are mapped to subscribed network slices in a home network and the at least one second network slice is not provided by the first visited network

Figure 8:
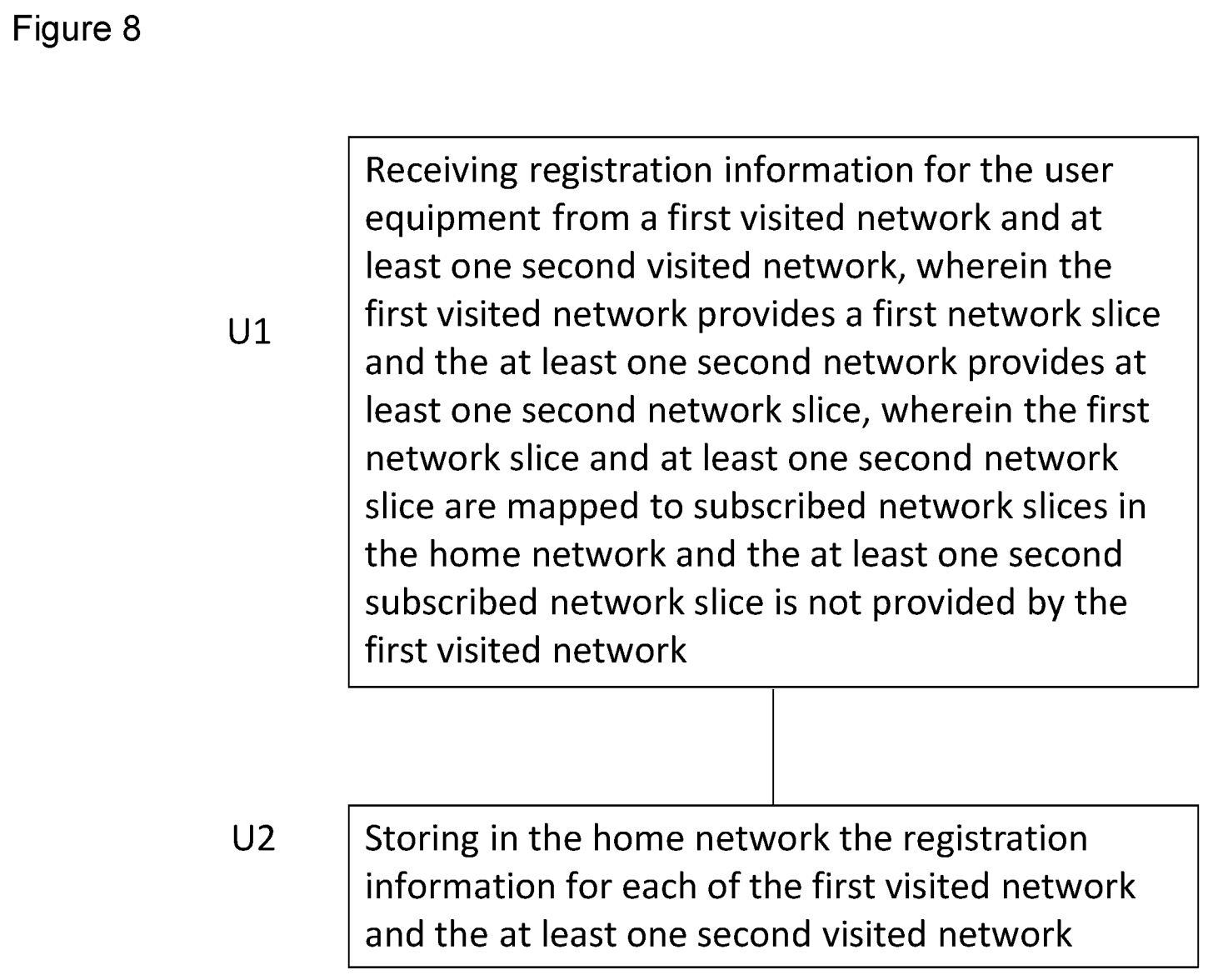

Receiving registration information for the user equipment from a first visited network and at least one second visited network, wherein the first visited network provides a first network slice and the at least one second network provides at least one second network slice, wherein the first network slice and at least one second network slice are mapped to subscribed network slices in the home network and the at least one second subscribed network slice is not provided by the first visited network

U2

Storing in the home network the registration information for each of the first visited network and the at least one second visited network

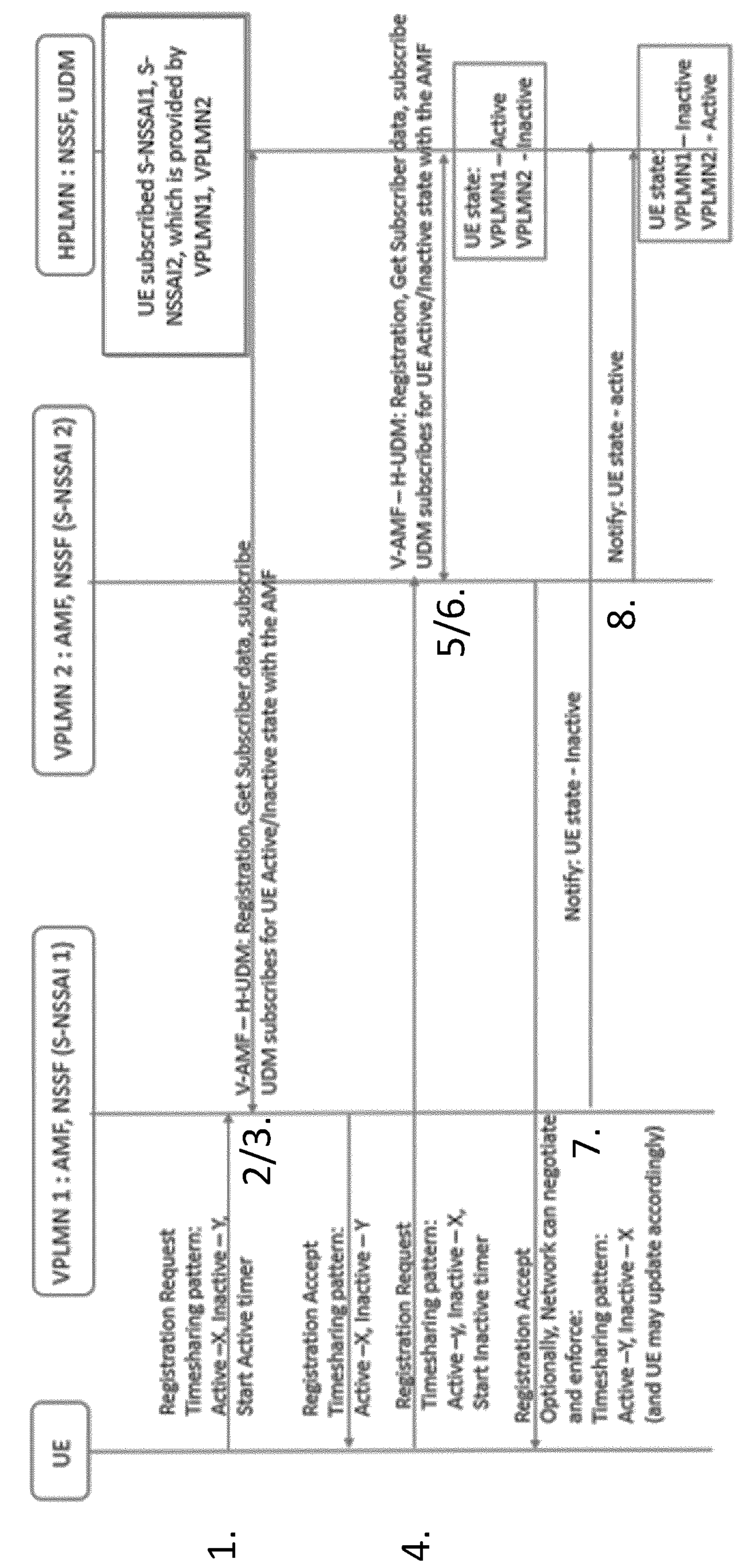
Figure 10
UE Registration with the Multiple Network
UE
VPLMN 1 : AMF, NSSF (S-NSSAI 1)
VPLMN 2 : AMF, NSSF (S-NSSAI 2)
HPLMN : NSSF, UDM
UE subscribed S-NSSAI1, S-NSSAI2, which is provided by VPLMN1, VPLMN2
1.
Registration Request
Timesharing pattern:
Active –X, Inactive –Y,
Start Active timer
2/3.
V-AMF -- H-UDM: Registration, Get Subscriber data, subscribe
UDM subscribes for UE Active/Inactive state with the AMF
Registration Accept
Timesharing pattern:
Active –X, Inactive – Y
4.
Registration Request
Timesharing pattern:
Active –y, Inactive – X,
Start Inactive timer
5/6.
V-AMF -- H-UDM: Registration, Get Subscriber data, subscribe
UDM subscribes for UE Active/Inactive state with the AMF
UE state:
VPLMN1 – Active
VPLMN2 - Inactive
Registration Accept
Optionally, Network can negotiate and enforce:
Timesharing pattern:
Active –Y, Inactive – X
(and UE may update accordingly)
7.
Notify: UE state - Inactive
8.
Notify: UE state - active
UE state:
VPLMN1 – Inactive
VPLMN2 - Active

METHOD, APPARATUS AND COMPUTER PROGRAM

RELATED APPLICATION

This application was originally filed as PCT Application No. PCT/EP2021/069317, filed on Jul. 12, 2021, which claims priority from IN application No. 202041033768, filed on Aug. 6, 2020, each of which is incorporated herein by reference in its entirety.

FIELD

The present application relates to a method, apparatus, and computer program and in particular but not exclusively to UE mobility in a roaming network.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices (also referred to as station or user equipment) and/or application servers. The communication sessions may comprise, for example, communication of data for carrying communications such as voice, video, electronic mail (email), text message, multimedia, content data, time-sensitive network (TSN) flows and/or data in an industrial application such as critical system messages between an actuator and a controller, critical sensor data (such as measurements, video feed etc.) towards a control system and so on. Non-limiting examples of services provided comprise two-way or multi-way calls, data communication or multimedia services and access to a data network system, such as the Internet.

In a wireless communication system at least a part of a communication session, for example, between at least two stations or between at least one station and at least one application server (e.g. for video), occurs over a wireless link. Examples of wireless systems comprise public land mobile networks (PLMN) operating based on 3GPP radio standards such as E-UTRA, New Radio, satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access one or more carriers provided by the network, for example a base station of a cell, and transmit and/or receive communications on the one or more carriers. In carrier aggregation (CA) two or more carriers are combined into one channel. In dual connectivity (DC), two carriers from different sites are combined, that is a user equipment may be dual (or multi) connected to two (or more) sites.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) based on the E-UTRAN radio-access technology, and so-called 5G system (5GS) including the 5G or next generation core (NGC) and the 5G Access network based on the New Radio (NR) radio-access technology. 5GS including NR are being standardized by the 3rd Generation Partnership Project (3GPP).

SUMMARY

In a first aspect there is provided an apparatus, said apparatus comprising means for providing a first registration request from a user equipment to a first visited network for a first network slice provided by the first visited network and providing a further registration request from the user equipment to at least one second visited network for at least one second network slice provided by the second visited network, wherein the first network slice and at least one second network slice are mapped to subscribed network slices in a home network and the at least one second network slice is not provided by the first visited network.

Each registration request may include a flag that registration at more than one visited network is supported at the user equipment.

Each registration request may include an indication of a first time period during which the user equipment will be in a first state and listen for paging requests from the respective visited network and a second time period during which the user equipment will be in a second state and not listen for paging requests from the respective visited network.

The first visited network and at least one second visited network may comprise a 3GPP network or a non-3GPP network.

In a second aspect there is provided an apparatus in a visited network comprising means for: receiving a registration request from a user equipment for a network slice and providing registration information based on the registration request for the user equipment to a home network associated with the user equipment, wherein the network slice is mapped to a subscribed network slice in the home network.

The registration request may include a flag that registration at more than one visited network is supported at the user equipment.

The registration request may include an indication of a first time period during which the user equipment will be in a first state and listen for paging requests from the visited network and a second time period during which the user equipment be in a second state and will not listen for paging requests from the visited network The apparatus may comprise means for determining updated values for the first time period and the second time period and providing an indication of the updated values to the user equipment.

The apparatus may comprise means for receiving a service request from the user equipment during the second time period and starting a timer for the first time period.

The apparatus may comprise means for receiving a subscription request from the home network for notification of a state of the user equipment and providing an indication to the home network when the user equipment moves from the first state to the second state and from the second state to the first state.

The first visited network and at least one second visited network may comprise a 3GPP network or a non-3GPP network.

In a third aspect there is provided an apparatus in a home network associated with a user equipment, comprising means for receiving registration information for the user equipment from a first visited network and at least one second visited network, wherein the first visited network provides a first network slice and the at least one second network provides at least one second network slice, wherein the first network slice and at least one second network slice are mapped to subscribed network slices in the home network and the at least one second network slice is not provided by the first visited network and storing in the home network the registration information for each of the first visited network and the at least one second visited network.

The registration information may comprise an indication of a state of the user equipment.

The registration information may include an indication of a first time period during which the user equipment will be in a first state and listen for paging requests from the respective visited network and a second time period during which the user equipment will be in a second state and not listen for paging requests from the respective visited network.

The apparatus may comprise means for providing a subscription request from the home network to each of the first visited network and the at least one second visited network, receiving an indication at the home network from each of the first visited network and the at least one second visited network when the user equipment moves from the first state to the second state and from the second state to the first state and storing the current state of the user equipment for each of the first visited network and the at least one second visited network.

The first visited network and at least one second visited network may comprise a 3GPP network or a non-3GPP network.

In a fourth aspect there is provided a method comprising providing a first registration request from a user equipment to a first visited network for a first network slice provided by the first visited network and providing a further registration request from the user equipment to at least one second visited network for at least one second network slice provided by the second visited network, wherein the first network slice and at least one second network slice are mapped to subscribed network slices in a home network and the at least one second network slice is not provided by the first visited network.

Each registration request may include a flag that registration at more than one visited network is supported at the user equipment.

Each registration request may include an indication of a first time period during which the user equipment will be in a first state and listen for paging requests from the respective visited network and a second time period during which the user equipment will be in a second state and not listen for paging requests from the respective visited network.

The first visited network and at least one second visited network may comprise a 3GPP network or a non-3GPP network.

In a fifth aspect there is provided a method comprising, in a visited network, receiving a registration request from a user equipment for a network slice and providing registration information based on the registration request for the user equipment to a home network associated with the user equipment, wherein the network slice is mapped to a subscribed network slice in the home network.

The registration request may include a flag that registration at more than one visited network is supported at the user equipment.

The registration request may include an indication of a first time period during which the user equipment will be in a first state and listen for paging requests from the visited network and a second time period during which the user equipment be in a second state and will not listen for paging requests from the visited network The method may comprise determining updated values for the first time period and the second time period and providing an indication of the updated values to the user equipment.

The method may comprise receiving a service request from the user equipment during the second time period and starting a timer for the first time period.

The method may comprise receiving a subscription request from the home network for notification of a state of the user equipment and providing an indication to the home network when the user equipment moves from the first state to the second state and from the second state to the first state.

The first visited network and at least one second visited network may comprise a 3GPP network or a non-3GPP network.

In a sixth aspect there is provided a method in a home network associated with a user equipment, comprising receiving registration information for the user equipment from a first visited network and at least one second visited network, wherein the first visited network provides a first network slice and the at least one second network provides at least one second network slice, wherein the first network slice and at least one second network slice are mapped to subscribed network slices in the home network and the at least one second network slice is not provided by the first visited network and storing in the home network the registration information for each of the first visited network and the at least one second visited network.

The registration information may comprise an indication of a state of the user equipment.

The registration information may include an indication of a first time period during which the user equipment will be in a first state and listen for paging requests from the respective visited network and a second time period during which the user equipment will be in a second state and not listen for paging requests from the respective visited network.

The method may comprise providing a subscription request from the home network to each of the first visited network and the at least one second visited network, receiving an indication at the home network from each of the first visited network and the at least one second visited network when the user equipment moves from the first state to the second state and from the second state to the first state and storing the current state of the user equipment for each of the first visited network and the at least one second visited network.

The first visited network and at least one second visited network may comprise a 3GPP network or a non-3GPP network.

In a seventh aspect there is provided an apparatus comprising at least one processor and at least one memory including a computer program code, the at least one memory and computer program code configured to, with the at least one processor, cause the apparatus at least to: provide a first registration request from a user equipment to a first visited network for a first network slice provided by the first visited network and provide a further registration request from the user equipment to at least one second visited network for at least one second network slice provided by the second visited network, wherein the first network slice and at least one second network slice are mapped to subscribed network slices in a home network and the at least one second network slice is not provided by the first visited network.

Each registration request may include a flag that registration at more than one visited network is supported at the user equipment.

Each registration request may include an indication of a first time period during which the user equipment will be in a first state and listen for paging requests from the respective visited network and a second time period during which the user equipment will be in a second state and not listen for paging requests from the respective visited network.

The first visited network and at least one second visited network may comprise a 3GPP network or a non-3GPP network.

In an eighth aspect there is provided an apparatus comprising: at least one processor and at least one memory including a computer program code, the at least one memory and computer program code configured to, with the at least one processor, cause the apparatus at least to, in a visited network receive a registration request from a user equipment for a network slice and provide registration information based on the registration request for the user equipment to a home network associated with the user equipment, wherein the network slice is mapped to a subscribed network slice in the home network.

The registration request may include a flag that registration at more than one visited network is supported at the user equipment.

The registration request may include an indication of a first time period during which the user equipment will be in a first state and listen for paging requests from the visited network and a second time period during which the user equipment be in a second state and will not listen for paging requests from the visited network The apparatus be configured to determine updated values for the first time period and the second time period and provide an indication of the updated values to the user equipment.

The apparatus may be configured to receive a service request from the user equipment during the second time period and start a timer for the first time period.

The apparatus may be configured to receive a subscription request from the home network for notification of a state of the user equipment and provide an indication to the home network when the user equipment moves from the first state to the second state and from the second state to the first state.

The first visited network and at least one second visited network may comprise a 3GPP network or a non-3GPP network.

In a ninth aspect there is provided an apparatus comprising: at least one processor and at least one memory including a computer program code, the at least one memory and computer program code configured to, with the at least one processor, cause the apparatus at least to, in a home network associated with a user equipment receive registration information for the user equipment from a first visited network and at least one second visited network, wherein the first visited network provides a first network slice and the at least one second network provides at least one second network slice, wherein the first network slice and at least one second network slice are mapped to subscribed network slices in the home network and the at least one second network slice is not provided by the first visited network and store in the home network the registration information for each of the first visited network and the at least one second visited network.

The registration information may comprise an indication of a state of the user equipment.

The registration information may include an indication of a first time period during which the user equipment will be in a first state and listen for paging requests from the respective visited network and a second time period during which the user equipment will be in a second state and not listen for paging requests from the respective visited network.

The apparatus may be configured to provide a subscription request from the home network to each of the first visited network and the at least one second visited network, receive an indication at the home network from each of the first visited network and the at least one second visited network when the user equipment moves from the first state to the second state and from the second state to the first state and store the current state of the user equipment for each of the first visited network and the at least one second visited network.

The first visited network and at least one second visited network may comprise a 3GPP network or a non-3GPP network.

In a tenth aspect there is provided a computer readable medium comprising program instructions for causing an apparatus to perform at least the following providing a first registration request from a user equipment to a first visited network for a first network slice provided by the first visited network and providing a further registration request from the user equipment to at least one second visited network for at least one second network slice provided by the second visited network, wherein the first network slice and at least one second network slice are mapped to subscribed network slices in a home network and the at least one second network slice is not provided by the first visited network.

Each registration request may include a flag that registration at more than one visited network is supported at the user equipment.

Each registration request may include an indication of a first time period during which the user equipment will be in a first state and listen for paging requests from the respective visited network and a second time period during which the user equipment will be in a second state and not listen for paging requests from the respective visited network.

The first visited network and at least one second visited network may comprise a 3GPP network or a non-3GPP network.

In an eleventh aspect there is provided a computer readable medium comprising program instructions for causing an apparatus to perform at least the following in a visited network receiving a registration request from a user equipment for a network slice and providing registration information based on the registration request for the user equipment to a home network associated with the user equipment, wherein the network slice is mapped to a subscribed network slice in the home network.

The registration request may include a flag that registration at more than one visited network is supported at the user equipment.

The registration request may include an indication of a first time period during which the user equipment will be in a first state and listen for paging requests from the visited network and a second time period during which the user equipment be in a second state and will not listen for paging requests from the visited network The apparatus may be caused to perform determining updated values for the first time period and the second time period and providing an indication of the updated values to the user equipment.

The apparatus may be caused to perform receiving a service request from the user equipment during the second time period and starting a timer for the first time period.

The apparatus may be caused to perform receiving a subscription request from the home network for notification of a state of the user equipment and providing an indication to the home network when the user equipment moves from the first state to the second state and from the second state to the first state.

The first visited network and at least one second visited network may comprise a 3GPP network or a non-3GPP network.

In a twelfth aspect there is provided a computer readable medium comprising program instructions for causing an apparatus to perform at least the following in a home network associated with a user equipment receiving registration information for the user equipment from a first visited network and at least one second visited network, wherein the first visited network provides a first network slice and the at least one second network provides at least one second network slice, wherein the first network slice and at least one second network slice are mapped to subscribed network slices in the home network and the at least one second network slice is not provided by the first visited network and storing in the home network the registration information for each of the first visited network and the at least one second visited network.

The registration information may comprise an indication of a state of the user equipment.

The registration information may include an indication of a first time period during which the user equipment will be in a first state and listen for paging requests from the respective visited network and a second time period during which the user equipment will be in a second state and not listen for paging requests from the respective visited network.

The apparatus may be caused to perform providing a subscription request from the home network to each of the first visited network and the at least one second visited network, receiving an indication at the home network from each of the first visited network and the at least one second visited network when the user equipment moves from the first state to the second state and from the second state to the first state and storing the current state of the user equipment for each of the first visited network and the at least one second visited network.

The first visited network and at least one second visited network may comprise a 3GPP network or a non-3GPP network.

In a thirteenth aspect there is provided a non-transitory computer readable medium comprising program instructions for causing an apparatus to perform at least the method according to the fourth aspect, the method according to the fifth aspect or a method according to the sixth aspect.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which:

FIG. 6 shows a flowchart of a method according to an example embodiment;

FIG. 8 shows a flowchart of a method according to an example embodiment;

FIG. 10 shows a signalling flow according to an example embodiment;

DETAILED DESCRIPTION

Before explaining in detail the examples, certain general principles of a wireless communication system and mobile communication devices are briefly explained with reference to FIGS. 1 to 3 to assist in understanding the technology underlying the described examples.

An example of a suitable communications system is the 5G System (5GS). Network architecture in 5GS may be similar to that of LTE-advanced. Base stations of NR systems may be known as next generation Node Bs (gNBs). Changes to the network architecture may depend on the need to support various radio technologies and finer QoS support, and some on-demand requirements for e.g. QoS levels to support QoE of user point of view. Also network aware services and applications, and service and application aware networks may bring changes to the architecture. Those are related to Information Centric Network (ICN) and User-Centric Content Delivery Network (UC-CDN) approaches. NR may use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

5GS networks utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Figure 1:
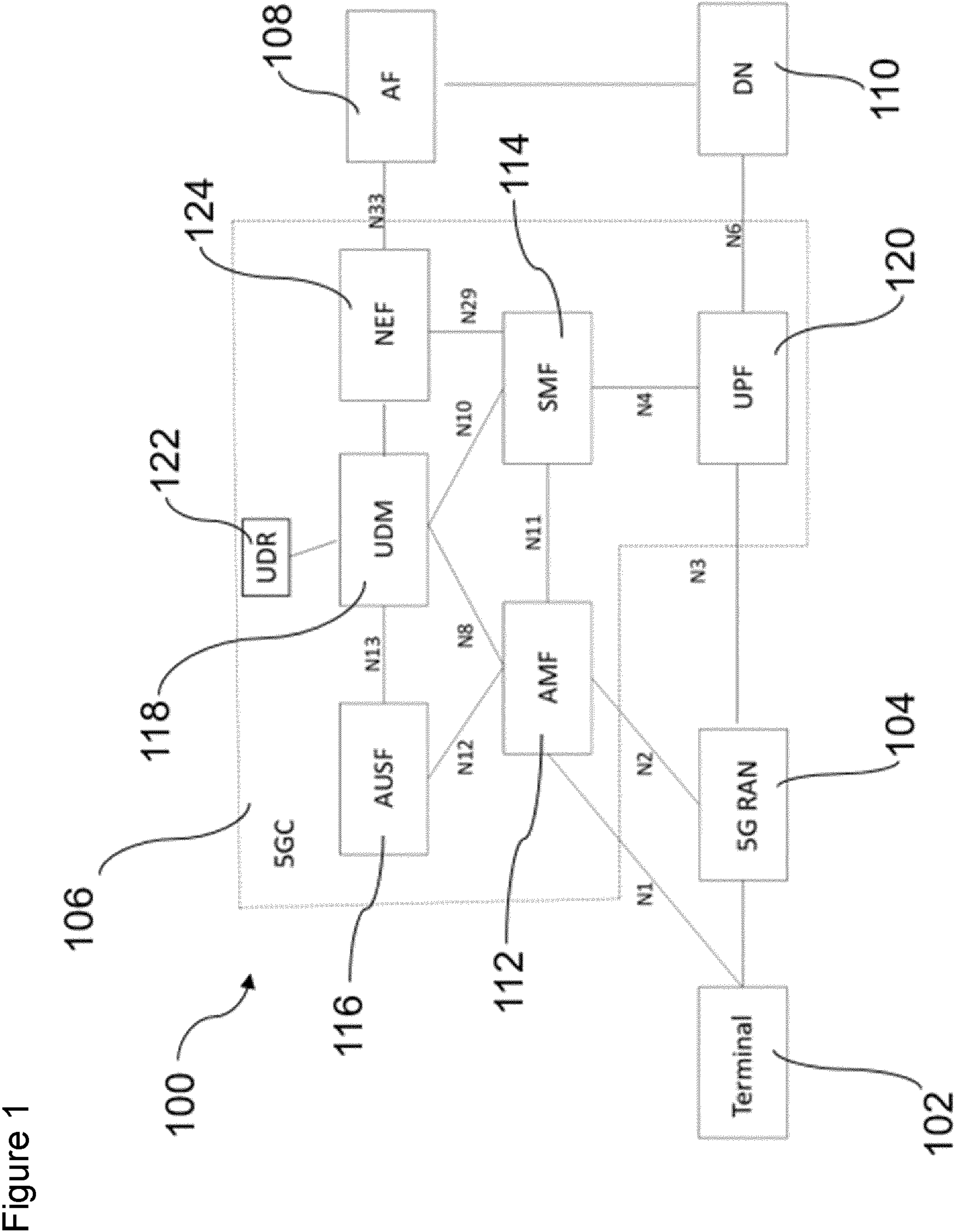
FIG. 1 shows a schematic diagram of an example 5GS communication system.

FIG. 1 shows a schematic representation of a 5G system (5GS) 100. The 5GS may comprise a user equipment (UE) 102 (which may also be referred to as a communication device or a terminal), a 5G radio access network (5GRAN) 104, a 5G core network (5GCN) 106, one or more application functions (AF) 108 and one or more data networks (DN) 110.

5G RAN may be realized with classical base transceiver station (BTS) and/or split functionalities like RU (Radio Unit), DU (Distributed Unit) and CU (Central Unit). DU and CU functionality may be realized as a physical network function or a Virtual Network Function.

An example 5G core network (CN) comprises functional entities. The 5GCN 106 may comprise one or more access and mobility management functions (AMF) 112, one or more session management functions (SMF) 114, an authentication server function (AUSF) 116, a unified data management (UDM) 118, one or more user plane functions (UPF) 120, a unified data repository (UDR) 122 and/or a network exposure function (NEF) 124. The UPF is controlled by the SMF (Session Management Function) that receives policies from a PCF (Policy Control Function).

The CN is connected to a UE via the radio access network (RAN). The 5GRAN may comprise one or more gNodeB (GNB) distributed unit functions connected to one or more gNodeB (GNB) centralized unit functions. The RAN may comprise one or more access nodes.

An UPF (User Plane Function) whose role is called PSA (PDU Session Anchor) may be responsible for forwarding frames back and forth between the DN (data network) and the tunnels established over the 5G towards the UE(s) exchanging traffic with the DN.

Figure 2:
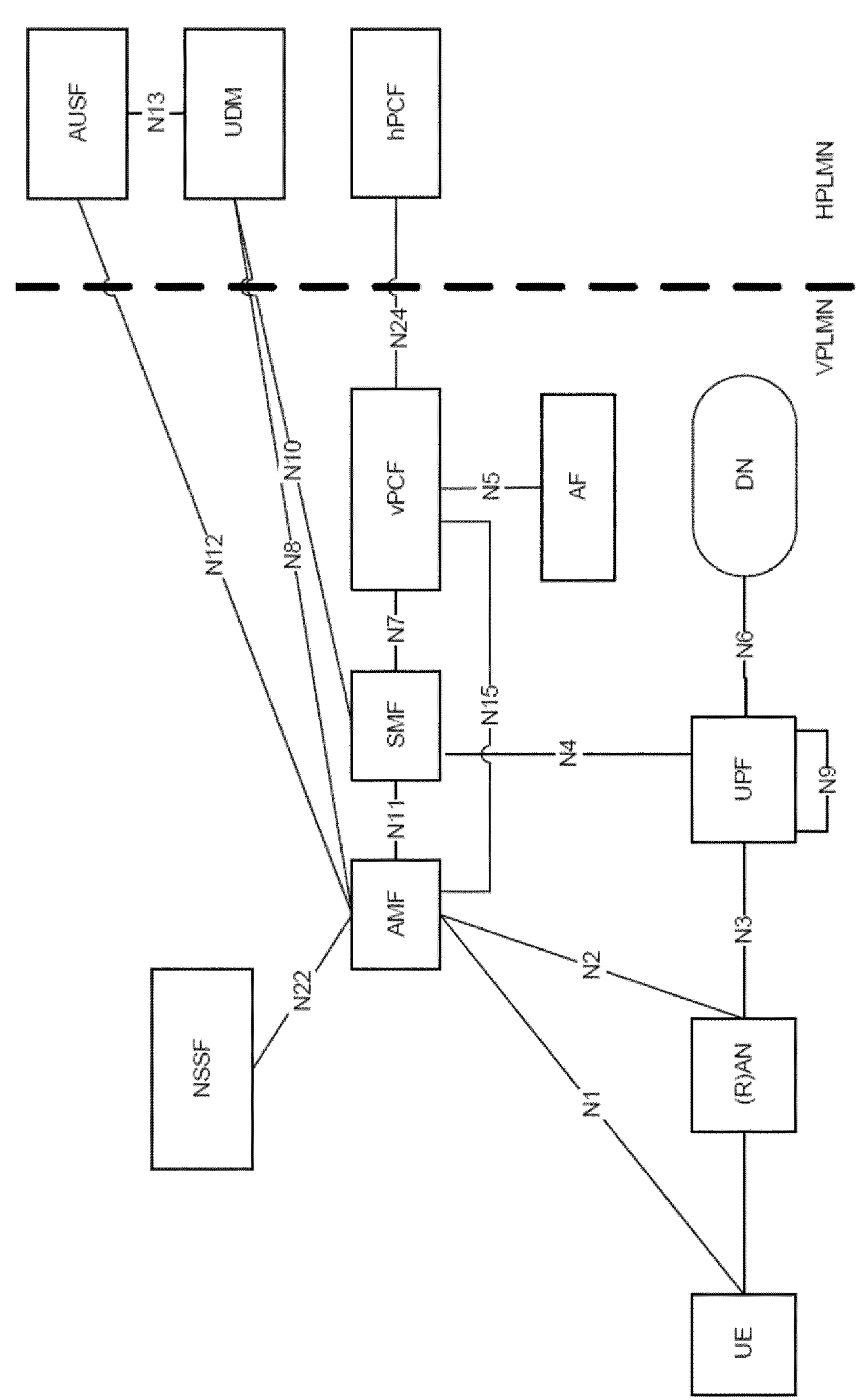
FIG. 2 shows a schematic diagram of an example Roaming 5G System architecture for local breakout scenario in reference point representation.

FIG. 2 shows a roaming 5G System architecture for a local breakout scenario in reference point representation.

Figure 3:
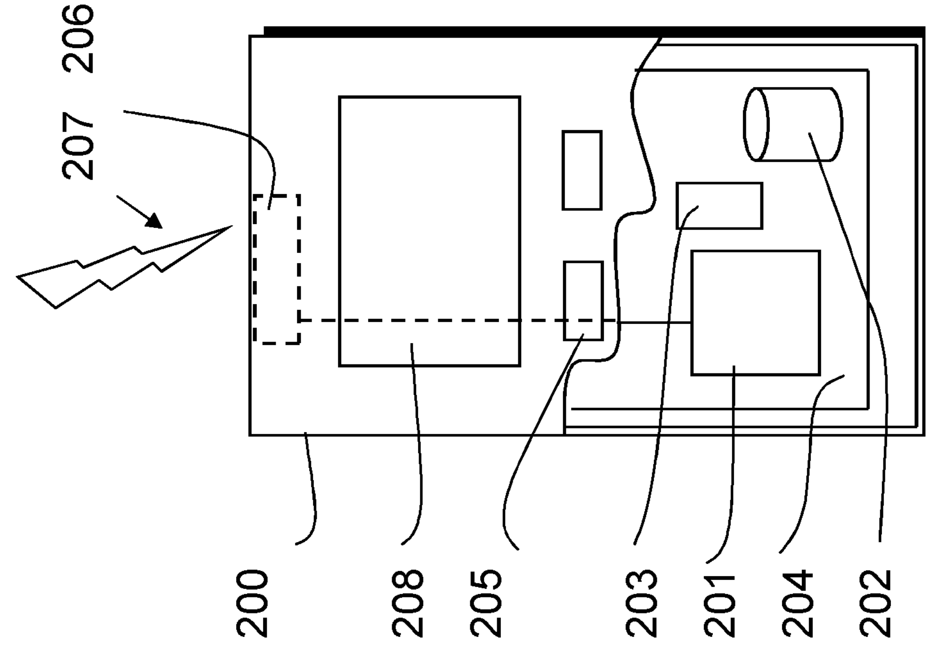
FIG. 3 shows a schematic diagram of an example mobile communication device.

A possible mobile communication device will now be described in more detail with reference to FIG. 3 showing a schematic, partially sectioned view of a communication device 200.

Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The mobile device 200 may receive signals over an air or radio interface 207 via appropriate apparatus for receiving and may transmit signals via appropriate apparatus for transmitting radio signals. In FIG. 3 transceiver apparatus is designated schematically by block 206. The transceiver apparatus 206 may be provided for example by means of a radio part and associated antenna arrangement. The antenna arrangement may be arranged internally or externally to the mobile device.

Figure 4:
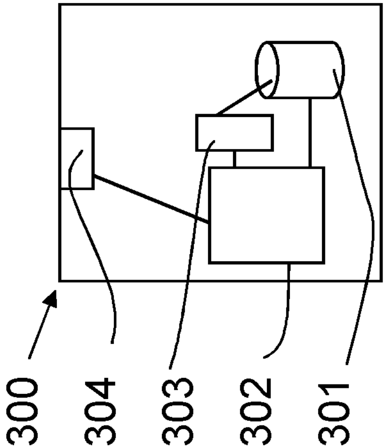
FIG. 4 shows a schematic diagram of an example control apparatus.

FIG. 4 shows an example embodiment of a control apparatus for a communication system, for example to be coupled to and/or for controlling a station of an access system, such as a RAN node, e.g. a base station, eNB or gNB, a relay node or a core network function such as AMF/SMF, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head.

The following is related to Network Slicing in 5G mobile network and UE access to subscribed slices provided by different visited PLMNs (VPLMNs) in roaming scenarios.

TS 23.501-5G; System Architecture for the 5G system, section 5.17.2.1 describes Dual Registration mode.

In order to interwork with the evolved packet core (EPC), the UE that supports both 5GC and EPC Non-Access Stratum (NAS) can operate in single-registration mode or dual-registration mode:

In single-registration mode, UE has only one active mobility management (MM) state (either registration management (RM) state in 5GC or EPC mobility management (EMM) state in EPC) and it is either in 5GC NAS mode or in EPC NAS mode (when connected to 5GC or EPC, respectively). UE maintains a single coordinated registration for 5GC and EPC. Accordingly, the UE maps the Evolved Packet switched System (EPS_-Globally Unique Temporary Identity (GUTI) to 5G GUTI during mobility between EPC and 5GC and vice versa following the mapping rules in Annex B. To enable re-use of a previously established 5G security context when returning to 5GC, the UE also keeps the native 5G-GUTI and the native 5G security context when moving from 5GC to EPC.

In dual-registration mode, UE handles independent registrations for 5GC and EPC using separate Radio Resource Control (RRC) connections. In this mode, UE maintains 5G-GUTI and EPS-GUTI independently. In this mode, UE provides native 5G-GUTI, if previously allocated by 5GC, for registrations towards 5GC and it provides native EPS-GUTI, if previously allocated by EPC, for Attach/Tracking Area Update (TAU) towards EPC. In this mode, the UE may be registered to 5GC only, EPC only, or to both 5GC and EPC.

Dual-registration mode is intended for interworking between EPS/E-UTRAN and 5GS/NR. A dual-registered UE should not send its E-UTRA connected to 5GC and E-UTRAN radio capabilities to NR access when connected to 5GS/NR to avoid being handed over to 5GC-connected E-UTRA or to E-UTRAN.

TS 23.501, section 5.15.6 describes Network slice selection during Roaming.

If the VPLMN and Home PLMN (HPLMN) have a Service Level Agreement (SLA) to support non-standard Single-Network Slice Selection Assistance Information (S-NSSAI) values in the VPLMN, the Network Slice Selection Function (NSSF) of the VPLMN maps the Subscribed S-NSSAIs values to the respective S-NSSAI values to be used in the VPLMN. The S-NSSAI values to be used in the VPLMN are determined by the NSSF of the VPLMN based on the SLA. The NSSF of the VPLMN need not inform the HPLMN of which values are used in the VPLMN.

Depending on operator's policy and the configuration in the AMF, the AMF may decide the S-NSSAI values to be used in the VPLMN and the mapping to the Subscribed S-NSSAIs.

The UE constructs Requested NSSAI and provides the mapping of S-NSSAIs of the Requested (Network Slice Selection Assistance Information) NSSAI to HPLMN S-NSSAIs if the mapping is stored in the UE, as described in clause 5.15.5.2.1 of TS 23.501.

The NSSF in the VPLMN determines the Allowed NSSAI without interacting with the HPLMN.

The Allowed NSSAI in the Registration Accept includes S-NSSAI values used in the VPLMN. The mapping information described above is also provided to the UE with the Allowed NSSAI as described in clause 5.15.4 of TS 23.501.

In PDU Session Establishment procedure, the UE includes both:

(a) the S-NSSAI that matches the application (that is triggering the PDU Session Request) within the NSSP in the URSP rules or within the UE Local Configuration as defined in clause 6.1.2.2.1 of TS 23.503 [45]; the value of this S NSSAI is used in the HPLMN; and (b) an S-NSSAI belonging to the Allowed NSSAI that maps to (a) using the mapping of the Allowed NSSAI to HPLMN S-NSSAIs; the value of this S-NSSAI is used in the VPLMN.

TS 23.502-5G; Procedures for the 5G system states that during the registration the Home Network can provide Steering of Roaming information to the UE via the AMF (i.e. a list of preferred PLMN/access technology combinations or HPLMN indication that 'no change of the "Operator Controlled PLMN Selector with Access Technology" list stored in the UE is needed). The Home Network can include an indication for the UE to send an acknowledgement of the reception of this information.

TS 23.122—Architectural requirements defines:

If the MS receives a USAT REFRESH command qualifier (3GPP TS 31.111 [41]) of type "Steering of Roaming", the MS shall:

a) replace the highest priority entries in the "Operator Controlled PLMN Selector with Access Technology" list stored in the ME with the list provided in the REFRESH command;

b) delete the PLMNs identified by the list in the REFRESH command from the Forbidden PLMN list and from the Forbidden PLMNs for General Packet Radio Service (GPRS) service list, if they are present in these lists. This includes any information stored in the SIM and the ME internal memory;

TS 23.122 describes Network selection in VPLMN:

If the MS is in a VPLMN, the MS shall periodically attempt to obtain service on its HPLMN (if the EHPLMN list is not present or is empty) or one of its Equivalent HPLMNs (EHPLMNs_ (if the EHPLMN list is present) or a higher priority PLMN/access technology combinations listed in "user controlled PLMN selector" or "operator controlled PLMN selector" by scanning in accordance with the requirements that are applicable in the order:

i) either the HPLMN (if the EHPLMN list is not present or is empty) or the highest priority EHPLMN that is available (if the EHPLMN list is present);

ii) each PLMN/access technology combination in the "User Controlled PLMN Selector with Access Technology" data file in the SIM (in priority order);

iii) each PLMN/access technology combination in the "Operator Controlled PLMN Selector with Access Technology" data file in the SIM (in priority order) or stored in the ME (in priority order);

As per TS 23.501, section 5.4.1.1:

Whenever a UE in RM-REGISTERED state enters CM-IDLE state, it starts a periodic registration timer according to the periodic registration timer value received from the AMF during a Registration procedure.

After the expiry of the periodic registration timer, the UE shall perform a periodic registration. If the UE moves out of network coverage when its periodic registration timer expires, the UE shall perform a Registration procedure when it next returns to the coverage.

The AMF runs a Mobile Reachable timer for the UE. The timer is started with a value longer than the UE's periodic registration timer whenever the Connection Management (CM) state for the UE in RM-REGISTERED state changes to CM-IDLE. If the AMF receives an elapsed time from RAN when RAN initiate UE context release indicating UE unreachable, the AMF should deduce a Mobile Reachable timer value based on the elapsed time received from RAN and the normal Mobile Reachable timer value. The AMF stops the Mobile Reachable timer, if the UE CM state in the AMF moves to CM-CONNECTED state. If the Mobile Reachable timer expires, the AMF determines that the UE is not reachable.

However, the AMF does not know for how long the UE remains not reachable, thus the AMF shall not immediately de-register the UE. Instead, after the expiry of the Mobile Reachable timer, the AMF should clear the PPF and shall start an Implicit De-registration timer, with a relatively large value. The AMF shall stop the Implicit De-registration timer and set the PPF if the AMF moves the UE CM state in the AMF to CM-CONNECTED state.

If the UE CM state in the AMF is CM-IDLE, then AMF considers the UE always unreachable if the UE is in MICO mode (refer to clause 5.4.1.3).

If the PPF is not set, the AMF does not page the UE and shall reject any request for delivering DL signalling or data to this UE.

If the Implicit De-registration timer expires before the UE contacts the network, the AMF implicitly de-registers the UE.

As part of deregistration for a particular access (3GPP or non-3GPP), the AMF shall request the UE's related SMF to release the PDU Sessions established on that access.

A roaming UE may have subscriptions to multiple slices available in a visited area but not all slices are offered by the preferred VPLMN network in that area.

Based on a roaming agreement between HPLMN and VPLMNs, different operators may provide service to the UE for the subscribed network slices. This provides a situation where the UE needs to access non-preferred VPLMNs to access mutually exclusive network slices (which are not available from a preferred VPLMN).

Figure 5:
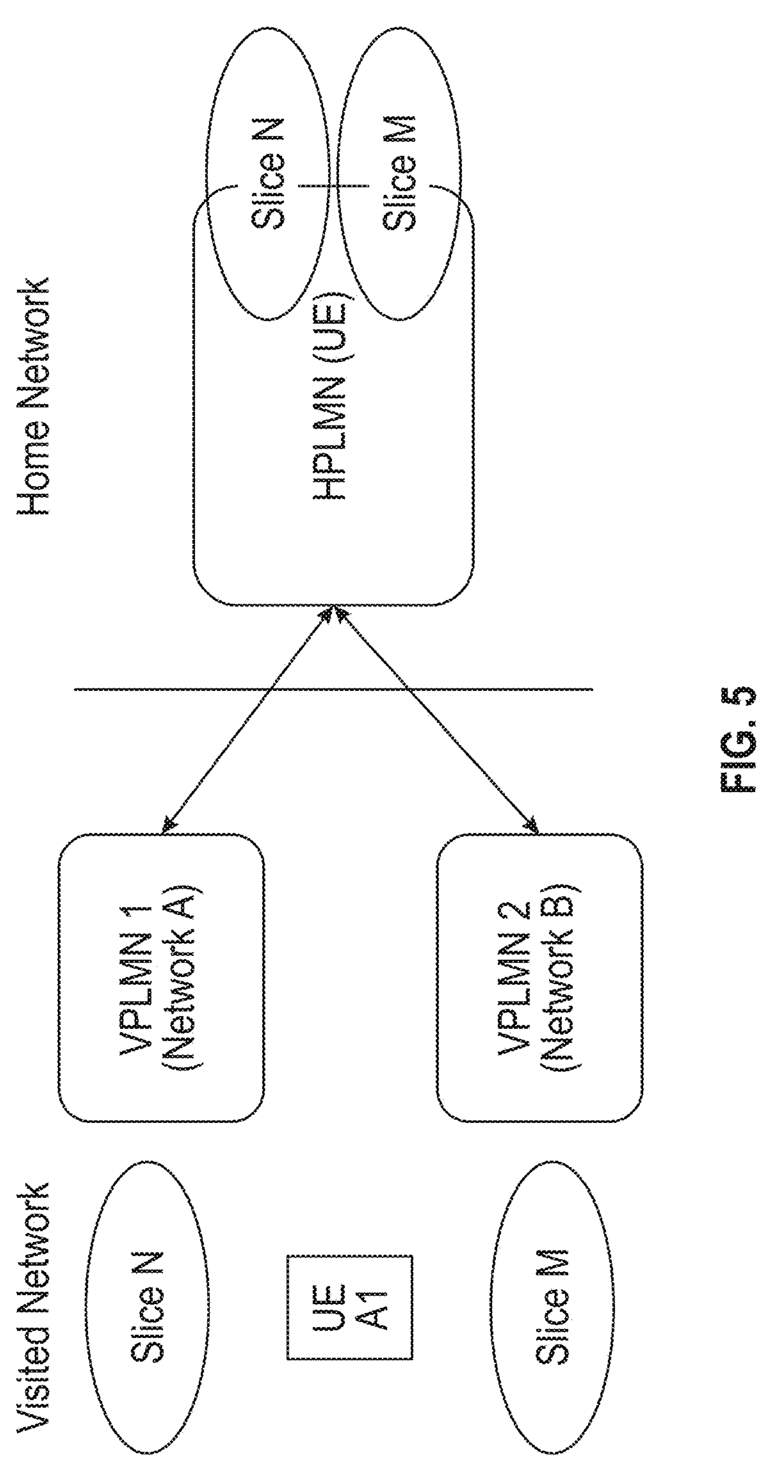
FIG. 5 shows a schematic diagram of a UE having a subscription to slices M and N in a visited Network.

FIG. 5 shows a scenario where UE A1 has subscriptions to slices N and M (or the equivalent) in HPLMN. In the visited area, slices N and M are provided by different network operators (VPLMNs), denoted by Network A and Network B respectively.

As part of network roaming agreements, Network A is the preferred partner for HPLMN in the visited area. Different applications in UE A1, for example app1 and app2, require slice M and N respectively to meet their SLA.

Each time the UE needs to toggle between accessing different applications which needs different network slices that are provided by different networks, the UE de-registers with the currently serving network and registers with the network providing the needed network slice.

The UE should return to the preferred VPLMN, once the service from non-preferred VPLMN is completed.

FIG. 6 shows a flowchart of a method according to an example embodiment. The method may be performed at a user equipment.

In a first step, S1, the method comprises providing a first registration request from a user equipment to a first visited network for a first network slice provided by the first visited network.

In a second step, S2, the method comprises providing a further registration request from the user equipment to at least one second visited network for at least one second network slice provided by the second visited network, wherein the first network slice and at least one second network slice are mapped to subscribed network slices in a home network and the at least one second network slice is not provided by the first visited network.

Figure 7:
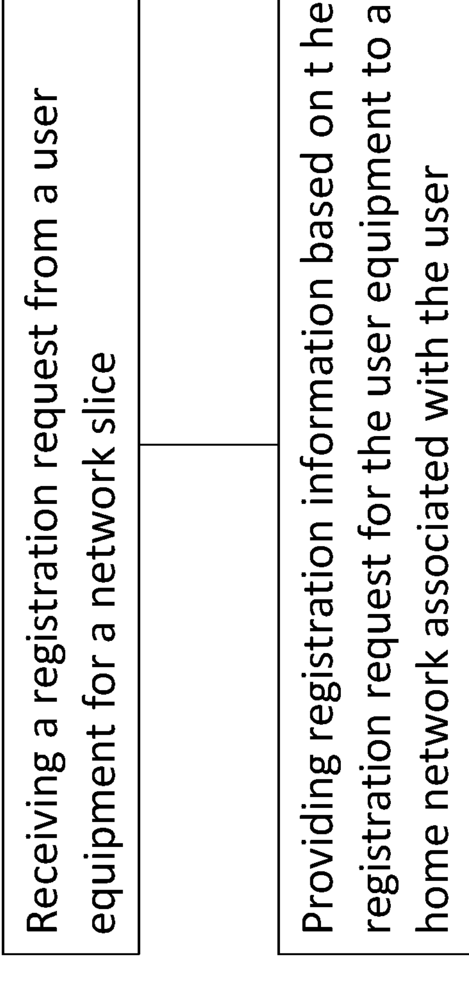
FIG. 7 shows a flowchart of a method according to an example embodiment.

FIG. 7 shows a flowchart of a method according to an example embodiment. The method may be performed at an apparatus (e.g., AMF) in one of the first and/or at least one second visited network.

In a first step, T1, the method comprises receiving a registration request from a user equipment for a network slice.

In a second step, T2, the method comprises providing registration information for the user equipment to a home network associated with the user equipment, wherein the network slice is mapped to a subscribed network slice in the home network.

FIG. 8 shows a flowchart of a method according to an example embodiment. The method may be performed at an apparatus, e.g., a UDM, in a home network associated with a user equipment.

In a first step, U1, the method comprises receiving registration information for the user equipment from a first visited network and at least one second visited network, wherein the first visited network provides a first network slice and the at least one second network provides at least one second network slice, wherein the first network slice and at least one second network slice are mapped to subscribed network slices in a home network and the at least one second subscribed network slice is not provided by the first visited network.

In a second step, U2, the method comprises storing in the home network the registration information for each of the first visited network and the at least one second visited network.

The registration information may comprise an indication of a state of the user equipment.

In the example methods described above, a UE uses the subscribed network slices available with the preferred VPLMN. When the preferred VPLMN cannot provide services for specific subscribed Network slices, the UE will access a non-preferred VPLMN to get those services.

The visited networks may comprise a 3GPP network (e.g., 5G or LTE) or a non-3GPP network (e.g., WLAN, Trusted IEEE 802.11 Non-3GPP access or any other suitable network that does not work on 3GPP specified frequency bands but are still part of the 3GPP network architecture).

The UE may trigger multiple registration procedure with different VPLMN based on subscribed S-NSSAI and VPLMN mapping information in the roaming area (e.g., register on the preferred VPLMN and any other VPLMN providing subscribed network slices not available in the preferred VPLMN).

A subscribed network slice may be defined as a subscribed NSSAI. A subscribed NSSAI list is the list of S-NSSAI subscribed by the UE in the HPLMN. The network slice for which the registration request is received may be described as a requested NSSAI is the S-NSSAI requested by the UE while accessing a visited network. A network slice provided by the visited network may be referred to as an allowed network slice or allowed NSSAI is the list of S-NSSAI that the VPLMN allows for the UE during registration (based on the Requested S-NSSAI, the agreement with the HPLMN and its capabilities to support different network slices/services).

The UE may maintain multiple registrations in VPLMNs independently.

The network (UDM) in the HPLMN may store a registration state for the UE for each VPLMN the UE may access based on requested S-NSSAI. The registration state may be updated during a registration/de-registration procedure by the respective VPLMNs.

Each registration request may include a flag that registration at more than one visited network is supported at the user equipment. For example, a UE with capability to maintain multiple registrations may indicate the support through a flag 'support multiple registration' during registration procedure with the network (VPLMN).

Each registration request may include an indication of a first time period during which the user equipment will be in a first state and will listen for paging requests from the respective visited network and a second time period during which the user equipment will be in a second state and not listen for paging requests from the respective visited network.

The first time period may be referred to as an active time period and the second time period may be referred to as an inactive time period. Each time period may have an associated timer (e.g., an active timer and an inactive timer) In an example embodiment, based on the application usage for different network slices, a UE calculates and indicate a timesharing pattern (e.g., the active time period, X and the inactive time period, Y). The pattern may be a pattern that repeats for the lifetime of the UE in the network (e.g., a periodic registration timer or until the UE triggers the next registration procedure.) The UE may indicate X, Y to Network A and B during a registration procedure. The UE may also indicate which timer (either active or inactive) is to be triggered as part of the registration.

The method may comprise determining updated values at the respective visited network for the first time period and the second time period and providing an indication of the updated values to the user equipment.

That is, the time sharing indicated by the UE may be further negotiated by the network. In an example embodiment, negotiated (i.e. updated) values may be indicated by the AMF in a Registration accept message. The network/AMF may use the past UE behaviour information or UE pattern to derive an appropriate timesharing pattern.

During Active timer, the respective visited network treats the UE as reachable. But during the Inactive timer, AMF clears the PPF (page proceed flag). UE may still trigger a service request with the network when Inactive timer is running at the AMF. Based on receiving such a request from the UE, the AMF may reset the timesharing pattern and start active timer. The method may comprise receiving a service request from the user equipment at the respective visited network during the second time period and starting a timer for the first time period.

A UE that supports dual RX/TX may not need to indicate the timesharing pattern, as it can listen/respond to two different PLMN at same time. When the UE registers with multiple VPLMNs (more than two), the timesharing pattern may be useful.

Figure 9:
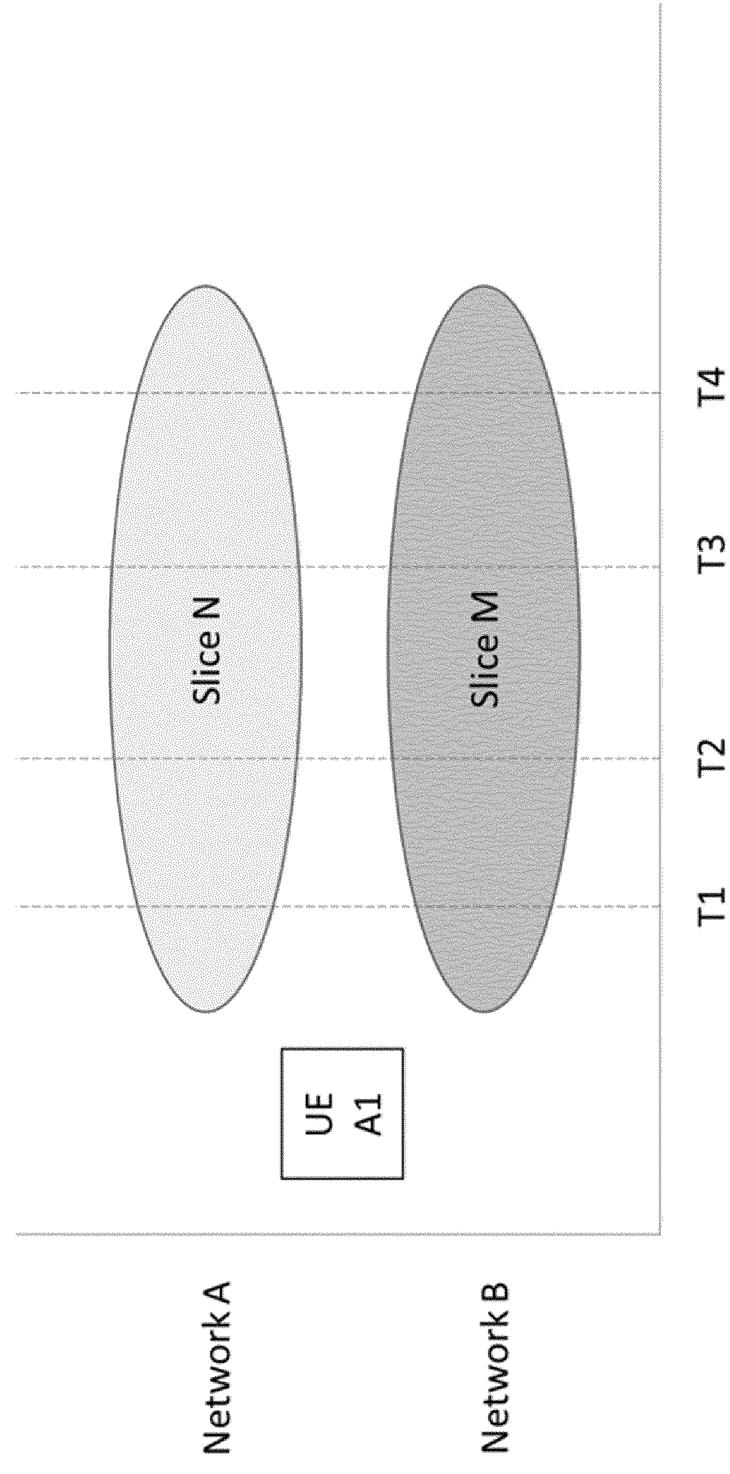
FIG. 9 shows a usage against time of a Slice N provided by Network A and a slice M provided by Network B.

FIG. 9 shows an example usage of slices N and M against time for UE A1.

At time T1, UE A1 needs to access application app2 that requires slice N from Network A.

At time T2, UE A1 needs to access application app1 that requires slice M from Network B.

At time T3, UE A1 may access application app2 that requires slice N from Network A.

At time T4, UE A1 may access application app1 that requires slice M from Network B.

The UE may be able to derive the application usage time it needs for each network slice. Alternatively, UE may derive the time X (when the UE needs to be active in Network A), Y (when the UE needs to be active in Network B), where X=Max (T2−T1, T4−T3) and Y=T3−T2 B).

The method may comprise providing a subscription request from the home network to each of the first and at least one second visited network for notification of the state of the user equipment. The method may comprise receiving an indication at the home network from each of the first visited network and the at least one second visited network when the user equipment moves from the first state to the second state and from the second state to the first state and storing at the home network the registration information for each of the first visited network and the at least one second visited network.

For example, a UDM of a HPLMN may subscribe with the AMF in the VPLMN (during the UE registrations) to get notified of the Active/Inactive state of the UE. The UDM may then update the UE state accordingly across various VPLMNs.

The UDM then knows which AMF (VPLMN) to reach, when a service-related entity requests the UDM to provide an indication regarding UE reachability (a UE reachability notification request procedure).

By default, the UE would camp on the preferred VPLMN network, when it has no requirement to access slices from non-preferred VPLMN.

FIG. 10 shows an example signalling flow for two VPLMN networks, which may be further expanded to multiple VPLMN networks. In this example embodiment, the UE first registers with a preferred VPLMN (e.g., VPLMN1) and, based on the services availability for the subscribed Network slices, the UE may register with non-preferred VPLMN (e.g., VPLMN2) for the network slices which are not available with the preferred VPLMN.

In step 1, the UE triggers a registration procedure with VPLMN1 and indicates timesharing pattern: X—Active, Y—Inactive, and flag—start active timer.

In step 2, AMF1 (VPLMN1) updates the UDM about the registration.

In step 3, UDM subscribes with AMF1 regarding update about UE state (active/Inactive). When the UE state changes from active/inactive, AMF1 informs the UDM.

In step 4, the UE triggers a registration procedure with VPLMN2 and indicates timesharing pattern: Y—Active, X—Inactive, and flag—start inactive timer.

In step 5, AMF2 (VPLMN2) updates the UDM about the registration.

In step 6, UDM subscribes with AMF2 regarding update about UE state (active/Inactive). When the UE state changes from active/inactive, AMF2 informs the UDM.

In step 7, the Inactive timer starts at AMF1. AMF1 clears the PPF flag and notifies the UDM about the UE state—Inactive.

In step 8, the Active timer starts at AMF2. AMF2 sets the PPF flag and notifies the UDM about the UE state—Active.

Potentially, more than two VPLMNs may be involved if the UE needs access to more than 2 network slices that are not available on the preferred VPLMN. In this case, the UE could have multiple registration states, each following the steps above.

Figure 11:
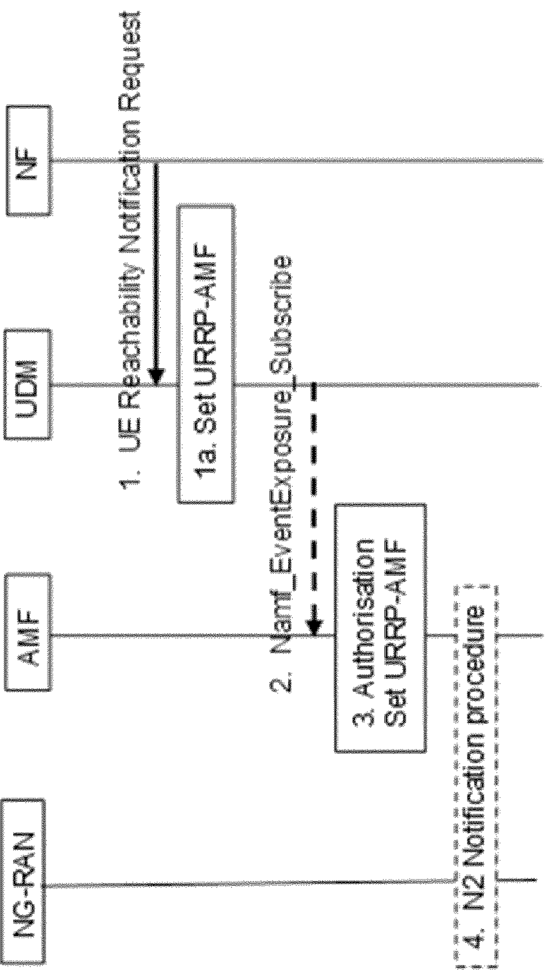
FIG. 11 shows a signalling flow for an example UE reachability procedure.

As per TS 23.502, section 4.2.5.2, the enhancement at UDM is to identify the AMF in which the UE is active based on its state (from the list of VPLMN based on multiple registration in roaming network due to different S-NSSAI) and indicate the same to the NF which requests the UDM to provide an indication regarding UE reachability (e.g., in a UE reachability procedure as shown in FIG. 11).

The method may enable UEs to access subscribed network slices provided by different operators in roaming scenarios. It provides PLMNs to have flexible and optimized business models among the PLMNs for roaming agreements. Enhanced registration states and registration procedures enable UEs for quicker inter PLMN/slice switch with less energy consumption.

The UE may maintain dual or multiple registration state of different VPLMN during roaming scenario. The UE may indicate the timesharing pattern with the network and the network knows when the UE is reachable (during Active timer) and when the UE is not reachable (during the Inactive timer), and accordingly clears PPF flag during the Inactive timer.

The method may enable a UE to have connectivity with subscribed network slices while roaming, even if they are supported by different VPLMNs in visiting networks. Enhancements to registration state and procedures may enable efficient network access based on timesharing.

The method may be implemented in a control apparatus as described with reference to 4.

An apparatus may comprise means for providing a first registration request from a user equipment to a first visited network for a first network slice provided by the first visited network; and providing a further registration request from the user equipment to at least one second visited network for at least one second network slice provided by the second visited network, wherein the first network slice and at least one second network slice are mapped to subscribed network slices in a home network and the at least one second network slice is not provided by the first visited network Alternatively, or in addition, an apparatus in a visited network may comprise means for receiving a registration request from a user equipment for a network slice and providing registration information based on the registration request for the user equipment to a home network associated with the user equipment, wherein the network slice is mapped to a subscribed network slice in the home network.

Alternatively, or in addition, an apparatus in a home network associated with a user equipment may comprise means for receiving registration information for the user equipment from a first visited network and at least one second visited network, wherein the first visited network provides a first network slice and the at least one second network provides at least one second network slice, wherein the first network slice and at least one second network slice are mapped to subscribed network slices in the home network and the at least one second network slice is not provided by the first visited network and storing in the home network the registration information for each of the first visited network and the at least one second visited network.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to LTE and 5GS, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various example embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Example embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed, there is a further embodiment comprising a combination of one or more embodiments with any of the other embodiments previously discussed.

The invention claimed is:

1. A user equipment comprising:

at least one processor and at least one memory storing instructions which, when executed by the at least one processor, cause at least performance of:

providing a first registration request from the user equipment to a first visited network for a first network slice provided by the first visited network; and providing a further registration request from the user equipment to at least one second visited network for at least one second network slice provided by the at least one second visited network, wherein the first network slice and at least one second network slice are mapped to subscribed network slices in a home network and the at least one second network slice is not provided by the first visited network which provided the first network slice.

2. The user equipment according to claim 1, wherein each registration request includes a flag indicating that registration at more than one visited network is supported at the user equipment.

3. The user equipment according to claim 1, wherein each registration request includes an indication of:

a first time period during which the user equipment will be in a first state and listen for paging requests from a respective visited network, and a second time period during which the user equipment will be in a second state and not listen for paging requests from the respective visited network.

4. The user equipment according to claim 1, wherein the first visited network and the at least one second visited network comprise a 3GPP network or a non-3GPP network.

5. An apparatus comprising:

at least one processor and at least one memory storing instructions which, when executed by the at least one processor, cause at least performance of:

receiving registration information for a user equipment from a first visited network and at least one second visited network;

providing a subscription request from a home network associated with the user equipment to each of the first visited network and the at least one second visited network;

receiving an indication at the home network from each of the first visited network and the at least one second visited network when the user equipment moves from a first state to a second state and from the second state to the first state; and storing a current state of the user equipment for each of the first visited network and the at least one second visited network, wherein the first visited network provides a first network slice and the at least one second visited network provides at least one second network slice, wherein the first network slice and the at least one second network slice are mapped to subscribed network slices in the home network, and the at least one second network slice is not provided by the first visited network; and storing, in the home network, the registration information for each of the first visited network and the at least one second visited network.

6. The apparatus according to claim 5, wherein the registration information comprises an indication of a state of the user equipment.

7. The apparatus according to claim 5, wherein the registration information includes an indication of:

a first time period during which the user equipment will be in the first state and listen for paging requests from a respective visited network, and a second time period during which the user equipment will be in the second state and not listen for paging requests from the respective visited network.

8. The apparatus according to claim 5, wherein the apparatus is configured for use in the home network associated with the user equipment.

9. The apparatus according to claim 5, wherein the first visited network and the at least one second visited network comprise a 3GPP network or a non-3GPP network.

10. The apparatus according to claim 5, wherein the apparatus is implemented by a core network node configured to perform functions of a unified data management.

* * * * *